United States Patent [19]

Ryang

[11] Patent Number: 4,847,154

[45] Date of Patent: Jul. 11, 1989

[54] THERMOSETTING RESIN SYSTEMS CONTAINING SECONDARY AMINE-TERMINATED SILOXANE MODIFIERS

[75] Inventor: Hong-Son Ryang, Camarillo, Calif.

[73] Assignee: BASF Corporation, Parsippany, N.J.

[21] Appl. No.: 100,514

[22] Filed: Sep. 24, 1987

Related U.S. Application Data

[63] Continuation-in-part of Ser. No. 55,312, May 29, 1987.

[51] Int. Cl.[4] .............................................. B32B 17/10
[52] U.S. Cl. .................................... 428/415; 428/447; 428/450; 428/458; 428/473.5; 428/416; 428/418; 525/101; 525/103; 525/393; 525/474; 525/476; 525/479; 525/523
[58] Field of Search ............... 525/523, 479, 474, 476, 525/103, 101, 393; 428/447, 450, 458, 473.5, 415, 416, 418

[56] References Cited

U.S. PATENT DOCUMENTS

| | | | |
|---|---|---|---|
| 3,146,250 | 8/1964 | Speier | 556/425 |
| 3,170,941 | 2/1965 | Speier | 556/425 |
| 4,645,614 | 2/1987 | Goossens et al. | 528/38 |

*Primary Examiner*—Melvyn I. Marquis
*Attorney, Agent, or Firm*—William G. Conger

[57] ABSTRACT

Modified heat-curable resins having enhanced toughness are prepared through incorporation of certain secondary amine terminated organosilicones or prereacts of these organosilicones with epoxy, cyanate, or bismaleimide resins. These modified resins are useful as toughened matrix resins, as high temperature, high strength elastomers, and, particularly, as structural adhesives.

12 Claims, No Drawings

THERMOSETTING RESIN SYSTEMS CONTAINING SECONDARY AMINE-TERMINATED SILOXANE MODIFIERS

This application is a continuation-in-part of copending application Ser. No. 055,312, filed on May 29, 1987.

BACKGROUND OF THE INVENTION

1. Field of the Invention

The subject invention relates to thermosetting resin systems which contain certain secondary amine-terminated siloxane modifiers. The modified resins find uses as heat-curable matrix resins in fiber-reinforced prepregs, as laminating films, and as structural adhesives.

2. Description of the Related Art

Modern high-performance thermosetting resin systems contain a variety of heat-curable resins. Among these are epoxy resins, malemide-group-containing resins, and the cyanate resins. All these resins are noted for their high tensile and compressive strengths and their ability to retain these properties at elevated temperatures, and all find extensive use in the aerospace and transportation industries. Other thermosetting systems which may be useful at lower temperatures or for specific applications include the polyurethanes, polyureas, polyacrylics, and unsaturated polyesters.

Unfortunately, many of these resin systems tend to be brittle. Thus while exhibiting high strengths under constant or slowly changing stress/strain, these systems and the structures which contain them may be susceptible to impact-induced damage. It would be desirable to prepare matrix resin and adhesive formulations which maintain their high strength properties while having enhanced toughness.

In the past, functionalized elastomers such as the amino- or carboxy-terminated butadiene-acrylonitrile copolymers (ATBN and CTBN, respectively) available from B. F. Goodrich Corp. under the trademark Hycar® have been used with some degree of success in toughening both adhesive and matrix resin formulations. See, for example, the article by J. Riffle, et. al., entitled "Elastomeric Polysiloxane Modifiers" in *Epoxy Resin Chemistry II*, R. Bauer, Ed., ACS Symposium Series No. 221, American Chemical Society, and the references cited therein.

The use of ATBN elastomers having carbon backbones, while increasing toughness, does not provide sufficient thermal and/or oxidative stability for many modern applications of adhesives and matrix resins, particularly those in the aerospace field. Thus it has been proposed to utilize functionalized polysiloxanes for these applications, relying on the thermal-oxidative stability of the silicon-containing backbone to lend increased thermal stability to the total resin system. Several such approaches have been discussed in Riffel, supra, and involve primary amine terminated polysiloxanes such as bis(3-aminopropyl)polysiloxanes and secondary amine terminated polysiloxanes such as bis(-piperazinyl)polysiloxanes.

Perhaps due to their lower functionality, the secondary amine terminated, piperazinyl polysiloxanes generally proved to have superior physical properties compared to the primary amine terminated polysiloxanes (tetrafunctional). Unfortunately, these secondary amine terminated polysiloxanes are difficult to prepare.

One preparation of piperazinyl functionalized polysiloxanes involves reaction of 2-aminoethylpiperazine with a previously synthesized carboxy-terminated polysiloxane to form the bis(2-piperazinyl ethyl amide) of the polysiloxane:

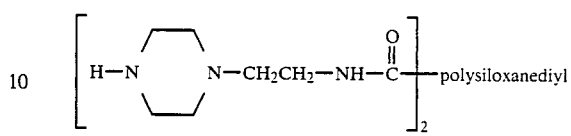

A second approach is to react a large excess (to avoid polymer formation) of piperazine with a bis-epoxy polysiloxane, producing a bis(2-hydroxy-3-piperazinyl) polysiloxane:

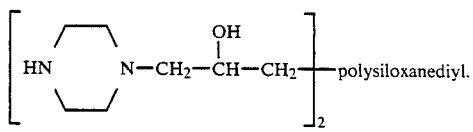

This method, of course, requires prior preparation of the epoxy-functional polysiloxane.

Ryang, in U.S. Pat. No. 4,511,701, prepared both primary and secondary amine-terminated polysiloxanes by reacting an appropriately substituted diamine with difunctional silylnorbornane anhydrides, themselves prepared as disclosed by Ryang in U.S. Pat. No. 4,381,396. Reaction of these diamines with the bis(anhydride) functional polysiloxanes results in amino-imides such as:

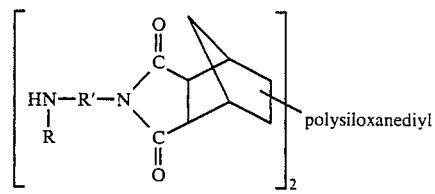

Only the last-mentioned process produces amino-functional polysiloxanes which are truly difunctional. The amide hydrogen and hydroxyl hydrogen produced by the first two preparations, though less reactive than the secondary amino hydrogens, are nevertheless reactive species in most resin systems. Their presence, therefore can cause further, and at times unpredictable cross-linking, either over an extended period of time in normal service, or as a result of high curing temperatures.

Furthermore, all of the foregoing preparations involve many steps, and in the process consume large quantities of relatively expensive chemical reagents. All these prior art products are difficult to prepare, expensive products, and thus there remains a need for thermally stable, secondary amine terminated polysiloxanes which may be prepared in high yield and in an economic manner.

SUMMARY OF THE INVENTION

It has now been found that the use of certain secondary amine-functionalized organosilicones may be used to modify a wide variety of thermosetting resin systems. These secondary amine-functionalized organosilicones may be used as reactive modifiers in any resin system which contains chemical groups which are reactive towards secondary amino groups. Alternatively, the secondary amine-functionalized organosilicones may be prereacted with a monomeric, oligomeric, or polymeric reagent to form a "prereact" which is compatible but not necessarily reactive with the primary resin. Such modified resins display considerably enhanced toughness while maintaining their elevated temperature performance. Adhesives formulated with such modifiers show surprisingly enhanced lap shear strengths.

These modifiers may be readily prepared in quantitative or nearly quantitative yields, by reacting a secondary N-allylamine corresponding to the formula:

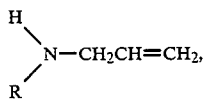

or an analogous secondary N-(γ-butenyl)- or N-(δ-pentenyl)amine with an Si-H functional organosilicone, preferably a 1,1,3,3-tetrasubstituted disiloxane of silane functional persubstituted polysiloxane, in the presence of a suitable catalyst. In the disclosure which follows, references to the reaction of secondary N-allylamines should be taken to include, where appropriate, the corresponding reaction of secondary-N-(γ-butenyl)amines and secondary-N-(δ-pentenyl)amines. Higher molecular weight polysiloxanes may be prepared by the equilibrium polymerization of the product of the above reaction with additional siloxane monomer to form secondary amine-functionalized homopolymers of higher molecular weight, or block or heteric organosilicones which correspond to the general formula

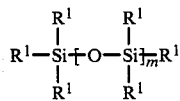

wherein each $R^1$ may be individually selected from the group consisting of alkyl, preferably $C_1$-$C_{12}$ lower alkyl; alkoxy, preferably $C_1$-$C_{12}$ lower alkoxy; acetoxy; cyanoalkyl; halogenated alkyl; and substituted or unsubstituted cycloalkyl, aryl, and aralkyl;

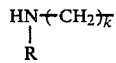

wherein k is an integer from 3 to about 5, preferably

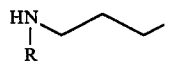

and X, wherein X is selected from the group consisting of

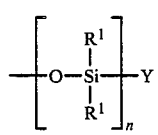

wherein Y is selected from the group consisting of alkyl, preferably $C_1$-$C_{12}$ lower alkyl; alkoxy, preferably $C_1$-$C_{12}$ lower alkoxy; acetoxy; cyanoalkyl; halogenated alkyl; cycloalkyl; aryl; and aralkyl; wherein m is a natural number from 0 to about 10,000, preferably from 1 to about 500; wherein n is a natural number such that the sum of m+n is from about 0 to 10,000, preferably from 1 to about 1000, more preferably from 1 to about 500; and wherein at least one of $R^1$, S, or Y is

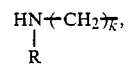

wherein k is an integer from 3 to about 5. Most preferably, the secondary amino functional organosilicones are bis[secondary γ-amino-functionalized] organsilicones which correspond to the formula

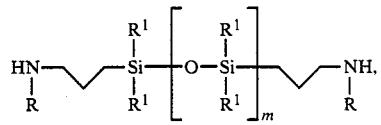

where R may be a substituted or unsubstituted alkyl, cycloalkyl, aryl, or aralkyl group which does not carry a primary amino group, and where each $R^1$ may be individually selected from cyano, alkyl halogenated alkyl, preferably $C_1$-$C_{12}$ lower alkyl, alkoxy, preferably $C_1$-$C_{12}$ lower alkoxy, acetoxy, cycloalkyl, aryl, or aralkyl groups, and wherein m is an integer from 0 to about 10,000, preferably 1 to about 500.

As indicated, the $R^1$ substituents may be the same as each other, or may be different. The phrase "may be individually selected," or similar language as used herein, indicates that individual $R^1$s may be the same or different from other $R^1$ groups attached to the same silicon atom, or from other $R^1$ groups in the total molecule. Furthermore, the carbon chain of the ω-aminoalkylene-functional organosilicone may be substituted by inert groups such as alkyl, cycloalkyl, aryl, arylalkyl, and alkoxy groups. References to secondary aminopropyl, aminobutyl, and aminopentyl groups include such substituted ω-aminoalkyl groups.

In addition to the preferred bis(N-substituted, secondary aminopropyl)polysiloxanes, tris- or higher analogues may also be prepared by the subject process if branched or multi-functional siloxanes are utilized. Such higher functionality secondary amino-functionalized siloxanes, for example, may be useful as curing agents with resins of lesser functionality. Monofunctional N-substituted, secondary 4-aminobutyl-, 5-aminopentyl, and 3-aminopropylsiloxanes may also be prepared. Such monofunctional siloxanes have uses as reactive modifiers in many polymer systems.

DESCRIPTION OF THE PREFERRED EMBODIMENTS

The secondary-amine-functional organosilicone modifiers of the subject invention may be prepared through the reaction of an N-allyl secondary amine with an Si-H functional organosilicone. In the discussion which follows, references to organosilicone reactants, in general, are intended to include silanes and di- and polysiloxanes which have Si-H functionality. The preferred reaction may be illustrated as follows:

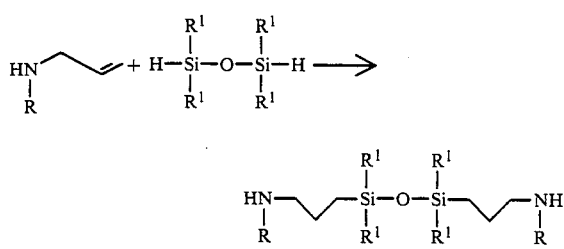

Of course, by varying the nature of the Si-H functional organosilicone, a variety of products may be obtained. For example, a polysiloxane having one or more pendant secondary amino functionalities may be prepared readily from an Si-H functional cyclic siloxane:

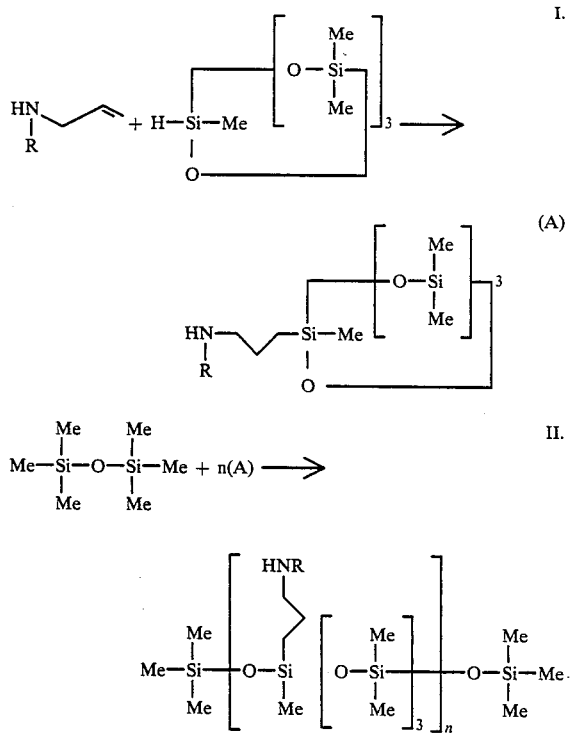

A wide variety of allylamines and corresponding γ-butenyl and δ-pentenylamines are useful in this synthesis. However, as is well known, amines such as the secondary alkylamines, for example dimethylamine and dipropylamine, as well as (primary) allylamine itself, fail to react in a satisfactory and reproducible manner. For example, U.S. Pat. No. 3,665,027 discloses the reaction of allylamine with a monofunctional hydrogen alkoxysilane. Despite the presence of the activating alkoxy groups and exceptionally long reaction times, the reaction provided at most an 85 percent yield. Furthermore, the reaction produces considerable quantities of potentially dangerous peroxysilanes as by-products. For these reasons, the preparation disclosed is not a desirable one for producing even monofunctional γ-aminopropyl trialkoxy siloxanes. Attempts to utilize the reaction for the preparation of higher functionality siloxanes, particularly alkyl-substituted siloxanes such as the poly(dimethyl)silicones, have not proven successful. It is also known that use of vinylamine leads only to intractable products of unspecified composition.

One reason that such processes produce poor and irreproducible results is the well known fact that primary amines poison platinum catalysts. The greater amount of amine present per mole of catalyst, the greater the degree of catalyst alteration. Thus where an amine such as allylamine or vinylamine is added in mole-to-mole correspondence with the hydrogen functionality of the hydrogen functional organosilicone, the expected catalyst function is disrupted and numerous side reactions, including polymerization of the vinyl or allyl compounds may occur. Thus it is necessary that the amine be a secondary, N-allylamine or secondary, N-(unsaturated alkylamine) wherein the double bond is located at least two carbons from the secondary amino nitrogen.

In the list of suitable secondary allylamines which follows, it should be noted that the corresponding γ-butenyl and δ-pentenylamines are also suitable. Examples of amines which are suitable, include N-alkyl-N-allyl amines such as N-methyl, N-ethyl, N-propyl, N-isopropyl, N-butyl, N-isobutyl, N-tert-butyl, and N-(2-ethylhexyl)allylamines and the like; cycloaliphatic-N-allylamines such as N-cyclohexyl, N-(2-methylcyclohexyl), and N-(4-methylcyclohexyl)-N-allylamines; aliphatic cycloaliphatic-N-allylamines such as N-cyclohexyl-methyl and N-(4-methylcyclohexylmethyl)-N-allylamines; aralkyl (aromatic-aliphatic)-N-allylamines such as N-benzyl, N-(4-methylbenzyl), N-(2-methylbenzyl), and N-(4-ethylbenzyl)-N-allylamines; aryl (aromatic)-N-allylamines such as N-phenyl, N-(4-methylphenyl), N-(4-nonylphenyl), and N-naphthyl-N-allylamines; and aromatic N-allylamines where the aromatic component has the formula

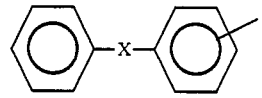

where X is

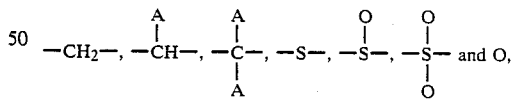

and where A is $C_1$-$C_6$ lower alkyl.

While these and many other N-allyl secondary amines are useful for the practice of the subject invention, it must be recognized that some are more preferred than others. In general, the cycloaliphatic and aryl-N-allylamines are preferred. Particularly preferred are N-cyclohexyl-N-allylamine and N-phenyl-N-allylamine. It should be noted that the secondary N-allyl amines are more preferred than their γ-butenyl and δ-pentenyl analogues.

As the Si-H functional organosilicone may be used compounds of the formulas:

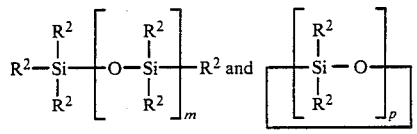

wherein R² is selected from the group consisting of hydrogen; alkyl, preferably C₁–C₁₂ lower alkyl; alkoxy, preferably C₁–C₁₂ lower alkoxy; acetoxy; cyanoalkyl; halogenated alkyl, preferably perhalogenated alkyl; and substituted or unsubstituted cycloalkyl, aryl, or aralkyl; and

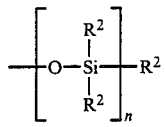

wherein m and n are natural numbers from 0 to about 10,000, preferably from 0 to about 500 and more preferably from 1 to about 100; wherein p is a natural number from 3 to about 20, preferably from 4 to about 8; and wherein the sum n+m is less than about 10,000, preferably less than about 500, more preferably less than about 100; and wherein at least one R² is hydrogen. Most preferably, the Si-H functional organosilicone is an Si-H functional disiloxane, preferably

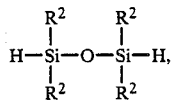

where R₂ is cyanoalkyl, halogenated alkyl, alkyl, alkoxy, cycloalkyl, or aryl. Examples of such Si-H functional organosilicones are trimethoxy- and triethoxysilane, tetramethyldisiloxane, tetraethyldisiloxane, 1,1,3,3,5,5-hexamethyltrisiloxane, methyltris(dimethylsiloxysilane), 1,1,3,3,5,5,7,7-octamethyltetrasiloxane, tetramethoxydisiloxane, tetraethoxydisiloxane, 1,1-bis(-trifluoropropyl)-3,3,-dimethyldisiloxane, pentamethylcyclopentasiloxane, heptamethylcyclotetrasiloxane, tetramethylcyclotetrasiloxane, methylhydrosiloxane-dimethyl-siloxane copolymers, and tetraphenyldisiloxane. Particularly preferred because of its low cost and ready availability is tetramethyldisiloxane. Mixed-substituted alkyl-aryl siloxanes such as 1,3-dimethyl-1,3-diphenyldisiloxane are also useful.

The N-allyl secondary amine and Si-H functional organosilicone are preferably reacted neat, in the absence of solvent. However solvents which are inert under the reaction conditions may be utilized if desired. The use of solvent may affect both the average molecular weight of the product polysiloxane and the molecular weight distribution.

The reaction temperature is preferably maintained between about 20° C. and 150° C. depending upon the nature and amount of catalyst and reactants. A catalyst is generally necessary to promote reaction between the amine and the Si-H functional organosilicone. Surprisingly, it has been found that even rather inefficient catalysts such as hexafluoro-platinic acid and hexachloroplatinic acid are highly effective, frequently resulting in quantitative yields. Other catalysts which are useful include those well known in the art, typically platinum catalysts in which the platinum is present in elemental or combined states, particularly di- or tetravalent compounds. Useful catalysts are, for example, platinum supported on inert carriers such as aluminum or silica gel; platinum compounds such as Na₂PtCl₄, K₂PtCl₄, and the previously mentioned platinic acids, particularly hexachloro- and hexafluoroplatinic acids. Also useful are alkylplatinum halides; siloxyorganosulfur-platinum or aluminoxyorganosulfur-platinum compositions, and those catalysts prepared through the reaction of an olefinic-functional siloxane with a platinum compound as disclosed in U.S. Pat. Nos. 3,419,593; 3,715,334; 3,814,730; and 4,288,345. Other catalysts may also be effective, such as those found in U.S. Pat. No. 3,775,452. All the foregoing U.S. Patents are herein incorporated by reference. However, because of its (relatively) low cost and the high yields it produces, hexachloroplatinic acid is the catalyst of choice.

Purification of the secondary amine-functionalized organosilicone product is accomplished by methods well known to those skilled in the art of purifying silicones. Generally, vacuum distillation is utilized, for example distillation at pressures less than about 1 torr. In some cases, purification may be effectuated by stripping off light fractions under vacuum, optionally with the aid of an inert stripping agent such as nitrogen or argon.

The secondary amine-functionalized organosilicones may be utilized as such, or they may be further polymerized with additional silicon-containing monomers to produce higher molecular weight secondary amine-functionalized polysiloxanes. For example, a secondary amine-functionalized tetramethyl disiloxane may be converted easily to a secondary amineterminated poly(-dimethylsiloxane) by equilibration with octamethylcyclotetrasiloxane:

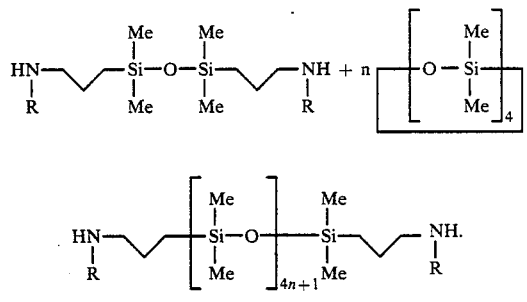

The equilibration co-polymerization is facilitated through the use of catalysts well known to those skilled in the art. A particularly useful catalyst which is relatively inexpensive and readily available is tetramethylammonium hydroxide. However, many other catalysts are also suitable, such as potassium hydroxide, cesium hydroxide, tetramethylammonium siloxanolate, and tetrabutylphosphonium hydroxide, which are also preferred.

If copolymer polysiloxanes are desired, then a different siloxane comonomer may be added to the reaction mixture. For example, a secondary amine-terminated tetramethyldisiloxane may be reacted on a mole to mole basis with octaphenylcyclotetrasiloxane to produce a copolymer polysiloxane having the nominal formula:

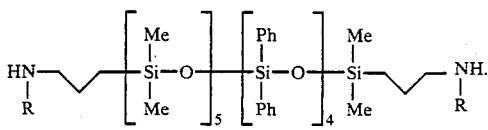

Or, in the alternative, the secondary amine-terminated disiloxane or polysiloxane may be reacted with mixtures of siloxane monomers to form block and block heteric structures.

The synthesis of secondary amine-functionalized organosilicone modifiers may be illustrated by the following preparative examples, which should not be considered as limiting in any way. All reagent quantities are by weight or by gram-mole, as indicated.

EXAMPLE 1

Synthesis of 1,3-bis(N-phenyl-3-aminopropyl)-1,1,3,3-tetramethyldisiloxane

N-allylaniline (0.200 mole) and 1,1,3,3-tetramethyldisiloxane (0.100 mole) are introduced along with 0.05 g hexachloroplatinic acid into a 100 ml cylindrical glass reactor equipped with reflux condenser, nitrogen inlet, and stir bar. The contents of the reaction are heated and maintained while stirring, at approximately 70° C., for a period of ten hours. The IR spectrum of the resulting viscous oil shows no peaks corresponding to Si-H, indicating completion of the reaction. The crude product is mixed with carbon black and stirred overnight at room temperature. The product is filtered through silica gel and the filter cake washed with toluene. Volatile fractions are removed by stripping under vacuum at 150° C. to give a slightly colored oil. The oil is further purified by vacuum distillation at <1 torr at 223°–230° C. The yield of 1,3-bis(N-phenyl-3-aminopropyl)-1,1,3,3-tetramethyldisiloxane is virtually quantitative.

EXAMPLE 2

Synthesis of 1,3-bis(N-cyclohexyl-3-aminopropyl)-1,1,3,3-tetramethyldisiloxane)

Following the technique described in Example 1, N-allylcyclohexylamine (0.173 mole), 1,1,3,3-tetramethyldisiloxane (0.0783 mole), and 0.05 g hexachloroplatinic acid are stirred at 70° C. for eight hours at 110° C. under nitrogen. The product, in nearly quantitative yield, is purified by vacuum distillation at <1 torr at a temperature of 207°–210° C.

EXAMPLE 3

Synthesis of α,ω-bis(N-phenyl-3-aminopropyl)polysiloxane copolymer

Into a 500 ml glass reactor equipped with a reflux condenser, mechanical stirrer, and nitrogen inlet are introduced 1,3-bis(N-phenyl-3-aminopropyl)-1,1,3,3-tetramethyl-disiloxane (0.100 mole), octamethylcyclotetrasiloxane (0.270 mole), octaphenylcyclotetrasiloxane (0.100 mole), and tetramethylammonium hydroxide (0.3 g). The reaction mixture is stirred at 80° C. for 44 hours followed by an additional 4 hours at 150° C., all under nitrogen. The resultant viscous oil is filtered and volatiles removed under vacuum at 300° C. The resulting copolymer is obtained in high yield as a slightly colored viscous oil.

EXAMPLE 4

Synthesis of α,ω-bis(N-cyclohexyl-3-aminopropyl capped polysiloxane copolymer

Utilizing the procedure of Example 3, 1,3-bis(N-cyclohexyl-3-aminopropyl)-1,1,3,3-tetramethyl disiloxane (0.0485 moles), octamethylcyclotetrasiloxane (0.179 moles), octaphenylcyclotetrasiloxane (0.067 mole) and tetramethylammonium siloxanolate (1.20 g) are allowed to react over a period of 40 hours at 90° C. and an additional 4 hours at 150° C. After cooling to room temperature, the filtered reaction mixture is vacuum stripped at <1 torr and 250° C. to yield a viscous oil in high yield.

EXAMPLE 5

Synthesis of α,ω-bis(N-phenyl-3-aminopropyl) Capped Polydimethylsiloxane 1,3-Bis(N-phenyl-3-aminopropyl)-1,1,3,3-tetramethyl-disiloxane (30.0 g), octamethylcyclotetrasiloxane (12.0 g), and tetramethylammonium hydroxide (0.06 g) are changed to a 500 ml glass reactor equipped with a reflux condenser, nitrogen inlet, and mechanical stirrer. The contents of the reactor are stirred at 80° C. for 30 hours, then at 150° C. for four hours under $N_2$ blanket. After filtration, the filtrate was further purified by eliminating volatile fractions under vacuum at 180° C. The resulting oligomer was a colorless viscous oil.

EXAMPLE 6

Synthesis of an α,ω-bis(N-phenyl-3-aminopropyl) Capped Polydimethylsiloxane 1,3-Bis(N-phenyl-3-aminopropyl-1,1,3,3-tetramethyl-disiloxane (4.0 g) is treated with octamethylcyclotetrasiloxane (100 g) and tetramethylammonium hydroxide (0.06 g) in a manner similar to that described in Experiment 5. The resulting oligomer is a colorless viscous oil having an average molecular weight of about 10,000.

EXAMPLE 7

Synthesis of a Siloxane Polymer 1,3-Bis(N-cyclohexyl-3-aminopropyl)-1,1,3,3-tetramethyldisiloxane (4.0 g) is treated with octamethylcyclotetrasiloxane (100 g) and tetrabutylphosphonium hydroxide (0.06 g) at 110° C. for four hours and 150° C. for three hours under nitrogen. Filtration followed by elimination of volatile fractions under vacuum at 160° C. gives a secondary amine terminated silicone oligomer having an average molecular weight of about 10,000.

Examples of thermosetting resin systems with which the subject invention modifiers are useful include but are not limited to epoxy resins, cyanate resins, maleimide-group-containing resins, isocyanate resins, unsaturated polyester resins, and the like. Particularly preferred are those resins which are reactive with secondary amines. Most preferred are the epoxy, cyanate, and maleimide resins.

Epoxy resins are well known to those skilled in the art. Such resins are characterized by having an oxiranyl group as the reactive species. The most common epoxy resins are the oligomeric resins prepared by reacting a bisphenol with epichlorohydrin followed by dehydrohalogenation. Preferred bisphenols are bisphenol S, bisphenol F, and bisphenol A, particularly the latter. Such resins are available in wide variety from numerous sources. Aliphatic epoxy resins are also useful, particularly those derived from dicyclopentadiene and other polycyclic, multiply unsaturated systems through epoxidation by peroxides or peracids.

For high temperature, high strength applications, epoxy resins containing dehydrohalogenated epichlorohydrin derivatives of aromatic amines are generally used. The most preferred of these resins are the derivatives of 4,4'-methylenedianiline and p-aminophenol. Examples of other epoxy resins which are useful may be found in the treatise *Handbook of Epoxy Resins* by Lee and Neville, McGraw-Hill, New York, c. 1967.

The epoxy resins described above are seldom used alone but are generally cured by means of curing agent reactive with the oxirane group. Suitable curing agents include primary and secondary amines, carboxylic acids, and acid anhydrides. Examples of suitable curing agents may be found in Lee and Neville, supra, in chapters 7–12. Such curing agents are well known to those skilled in the art. A particularly preferred curing agent for elevated temperature use is 4,4'-diaminodiphenylsulfone.

The maleimide-group containing resins useful for the practice of the subject invention are generally prepared by the reaction of maleic anhydride of a substituted maleic anhydride such as methylmaleic anhydride with an amino-group-containing compound, particularly a di- or polyamine. Such amines may be aliphatic or aromatic. Preferred maleimides are the bis-maleimides of aromatic diamines such as those derived from the phenylenediamines, the toluenediamines, and the methylenedianilines. A preferred polymaleimide is the maleimide of polymethylenepolyphenylenepolyamine (polymeric MDA).

In addition to the aromatic diamines described above, aliphatic maleimides derived from aliphatic di- and polyamines are useful. Examples are the maleimides of 1,6-hexanediamine, 1,8-octanediamine, 1,10-decanediamine, and 1,12-dodecanediamine. Particularly preferred are low melting mixtures of aliphatic and aromatic bismaleimides. These and other maleimides are well known to those skilled in the art. Additional examples may be found in U.S. Pat. Nos. 3,018,290; 3,018,292; 3,627,780; 3,770,691; 3,770,705; 3,839,358; 3,966,864; and 4,413,107. In addition, the polyaminobismaleimides which are the reaction product of an excess of bismaleimide with a diamine as disclosed in U.S. Pat. No. 3,562,223 may be useful. Also useful are bismaleimide compositions containing alkenylphenolic compounds such as allyl and propenyl phenols as disclosed in U.S. Pat. Nos. 4,298,720 and 4,371,719. In addition to being useful with bismaleimides, such comonomers may be useful in resin compositions containing epoxy and cyanate resins.

Cyanate resins may also be used to advantage in the subject invention. Such resins containing cyanate ester groups are well known to those skilled in the art. The cyanates are generally prepared from a di- or polyhydric alcohol by reaction with cyanogen bromide or cyanogen chloride. Cyanate resin preparation is described in U.S. Pat. No. 3,740,348, for example. Preferred cyanates are the cyanates derived from phenolic hydrocarbons, particularly hydroquinone, the various bisphenols, and the phenolic novolak resins such as those disclosed in U.S. Pat. Nos. 3,448,071 and 3,553,244.

The cyanate and epoxy resins are frequently used in combination, as these resins appear to be compatible with each other. Examples of epoxy/cyanate compositions are disclosed in U.S. Pat. Nos. 3,562,214 and 4,287,014.

The following examples illustrate the use of secondary amine-functionalized siloxanes in matrix resin and adhesive formulations.

EXAMPLE 8

Epoxy Resin Prereact

A prereact is prepared by heating to 145° C., for two hours under nitrogen, a mixture containing 15.0 g of the secondary amine-functionalized silicone oligomer of Example 4 and 13.8 g of DER ® 332, an epoxy resin which is a diglycidyl ether of bisphenol A available from the Dow Chemical Company, Midland, MI, which has an expoxy equivalent weight of from 172 to 176. The resulting product is a homogenous, viscous oil.

EXAMPLE 9

Curable Resin Adhesive Composition

To 2.88 g of the prereact of Example 8 is added 2.0 g Tactix ® 742, a glycidyl ether of tris(4-hydroxyphenyl)methane, and 2.62 g DER ® 332, both products of the Dow Chemical Company. The mixture was stirred at 100° C. for 30 minutes. Upon cooling to 70° C., 2.0 g of 4,4'-diaminodiphenylsulfone and 0.5 g of a fumed silica (CAB-O-SIL ® M-5, available from Cabot Corporation) are introduced with stirring. A catalyst solution is prepared separately by mixing 0.8 g 2-methylimidazole with 10.0 g DER ® 332 at room temperature. Following addition of 0.35 g of the catalyst solution to the resin, the mixture was coated onto a 112 glass fabric.

EXAMPLE 10

Comparison Adhesive

A comparison resin similar to the resin of Example 9 was prepared by coating 112 glass fabric with a similarly prepared mixture containing 2.0 g Tactix ® 742, 4.0 g DER ® 332, 2.0 g 4,4'-diaminodiphenylsulfone, 0.5 g CAB-O-SIL M-5, and 0.35 g of the catalyst solution as prepared in Example 9.

The adhesive films of Examples 9 and 10 were cured by heating at 177° C. for four hours, 200° C. for two hours, and 250° C. for one hour. Single lap shear strengths were measured by the method of ASTM D-1002. The comparative test results are presented in Table I below.

TABLE I

| Al/Al Lap Shear Strengths of Cured Adhesive Compositions | | |
|---|---|---|
| | Lap Shear Strength lb/in$^2$ | |
| Test Conditions | Example 9 (with modifier) | Example 10 (comparative - no modifier) |
| Ambient, initial | 2840 | 2130 |
| 177° C., initial | 3290 | 2660 |
| Ambient, aged[1] | 2370 | 1810 |
| 177° C., aged[1] | 3010 | 2560 |

[1]Aging at 177° C. for 500 hours

EXAMPLES 11, 12

Curable Resin Elastomer Compositions

The secondary amine-functionalized silicone oligomers from Examples 6 and 7 respectively (1.6 g) were treated with 0.1 g Tactix ® 742 and 0.3 g DER ® 332 at 130° C. for one hour. Following addition of 0.15 g 4,4'-diaminiodiphenylsulfone, the resulting resin systems were cured at 177° C. for two hours and 200° C. for three hours. The cured elastomers demonstrated improved strength as compared to cured silicone homopolymers. Thermal stabilities of the cured elastomers were examined by thermogravimetric analysis (TGA). The results are illustrated in Table II.

TABLE II

|  | TGA (°C.) in Air | |
| --- | --- | --- |
|  | 5% wt. loss | 10% wt. loss |
| Example 11 | 380 | 405 |
| Example 12 | 350 | 380 |

EXAMPLE 13

Prereact

A mixture of the secondary amine-functionalized silicone oligomer from Example 4 (30.0 g) Taxtix ® 742 (33.8 g), and DER ® 332 (22.1 g) is heated to 140° C. for three hours. The resulting product is a homogeneous viscous oil.

EXAMPLE 14

Resin Adhesive

The prereact of Example 13 (28.5 g) is mixed with Tactix ® 742 (12.8 g), DER ® 332 (4.3 g), and Compimid ® 353 (Boots-Technochemie, 16.0 g) at 130° C. for 30 minutes. At 70° C., 3,3'-diaminodiphenylsulfone (13.8 g), 4,4'-bis(p-aminophenoxy)-diphenylsulfone (6.1 g), and CAB-O-SIL M-5 (1.8 g) are introduced. The final resin mixture is coated on a 112 glass fabric. The adhesive film is cured by being heated for four hours at 177° C., two hours at 220° C., and one hour at 250° C. The single lap shear strengths (Al/Al) are 2200-psi at 20° C. and 2500 psi. at 205° C., respectively.

EXAMPLE 15

Curable Resin Compositions

A mixture of the secondary amine-functionalized silicone oligomer (15.0 g) from Example 3, Compimide 353 (10.0 g), and benzoic acid (0.1 g) is heated to 140° C. for six hours under $N_2$ with vigorous stirring. To the resulting mixture, additional Compimide (10.0 g) and tetra(o-methyl)bisphenol F dicyanate (70.0 g) are added. The mixture is stirred at 120° C. for 30 minutes under vacuum. At 70° C., CAB-O-SIL (N70-TS), 2.6 g) and dibutyltindilaurate (0.15 g) are introduced. The final resin mixture is coated on a 112 glass fabric.

EXAMPLE 16

Comparative Curable Resin Composition

A resin formulation is made in a similar manner to Example 15 from a 2-piperazinyl ethyl amide terminated butadiene-acrylonitrile copolymer (Hycar ® ATBN 1300+16, B. F. Goodrich Co.), (15.0 g), Compimide 353 (20.0 g), tetra(o-methyl)bisphenol F dicyanate (70.0 g), CAB-O-SIL N70-TS (2.6 g) and the dibutyltindilaurate catalyst (0.15 g). In this case, pretreatment is carried out by adding the ATBN modifier to Compimide 353 at 120° C. under $N_2$ stirring.

The adhesive films of Examples 15 and 16 are cured by being heated for four hours at 177° C., four hours at 200° C., and two hours at 230° C. The single lap shear strengths (Al/Al) of these formulations are shown in Table III.

TABLE III

| Al/Al Lap Shear Strengths of Cured Adhesive Compositions | | |
| --- | --- | --- |
|  | Shear Strength, lb./in$^2$ | |
| Test Conditions | Example 15 (silicone modified) | Example 16 (ATBN modified) |
| 20° C. | 3280 | 2670 |
| 205° C. | 3800 | 2900 |

The foregoing examples illustrate the versatility of secondary amine-funtionalized organosilicones as modifiers for a variety of resin systems. The stoichiometry of the systems may be readily adjusted to enable those skilled in the art to produce elastomer modified high strength matrix resins, high-temperature, high-strength elastomers, and high performance structural adhesives. In the claims which follow, the term "resin system" is utilized in its conventional meaning, i.e. a system characterized by the presence of a substantial amount of a heat curable resin together with customary catalysts and curing agents but devoid of the secondary amine-functionalized silicone modifiers of the subject invention.

The modified resin systems of the subject invention may be used as high performance structural adhesives, matrix resins, and elastomers. These compositions are prepared by techniques well known to those skilled in the art of structural materials.

The adhesives, for example, may be prepared as thin films from the melt, or by casting from solution. Often, the films do not have enough structural integrity to be handled easily. In this case, the adhesive is generally first applied to a lightweight support, or scrim. This scrim may be made of a wide variety of organic and inorganic materials, both woven and non-woven, and may be present in an amount of from about 1 to about 25 percent by weight relative to the weight of the total adhesive composition. The scrim adds little or no strength to the cured adhesive film, but serves to preserve the integrity of the film in its uncured state. Common scrim compositions include fiberglass, carbon/graphite, polyester, and the various nylons.

When used as a matrix resin, the compositions of the subject invention are applied to fiber reinforcement. The resin/reinforcement ratio can vary widely, but most prepregs prepared using the subject compositions will contain from 10 to 60 percent by weight, preferably from 20 to 40 percent by weight, and most preferably from about 27 to 35 percent by weight of matrix resin, the balance being reinforcing fibers. The reinforcing fibers may be woven or non-woven, collimated, or in the form of two or three dimensional fabric, or may, in the case of casting resins, be chopped.

In contrast to the scrim material used in adhesives, the reinforcing fibers in prepregs contribute substantially to the strength of the cured prepreg or composite made from them. Common reinforcing fibers utilized are carbon/graphite, fiberglass, boron, and silicon; and high strength thermoplastics such as the aramids, high modulus polyolefins; polycarbonates; polyphenylene oxides; polyphenylene sulfides; polysulfones; polyether ketones (PEK), polyether ether ketones (PEEK), polyether ketone ketone (PEEK) and variations of these; polyether sulfones; polyether ketone sulfones; polyimides; and polyether imides. Particularly preferred are those thermoplastics having glass transition temperatures (Tg) above 100° C., preferably above 150° C., and most preferably about 200° C. or higher.

When utilized as heat curable elastomers, the modified resins of the subject invention may or may not contain fibrous reinforcement of any of the kinds previously discussed. In contrast to their matrix resin kindred, the elastomers generally contain much higher proportions by weight of secondary amine-functionalized silicones or prereacts formed from them.

The embodiments of the invention in which an exclusive property or privilege is claimed are defined as follows:

1. A process for toughening a heat-curable resin system, comprising adding thereto a toughening amount of an organosilicone toughener selected from the group consisting of (a)

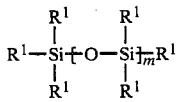

wherein each $R^1$ is individually selected from the group consisting of alkyl; alkoxy; halogenated alkyl; acetoxy; and substituted and unsubstituted cycloalkyl, aryl, and aralkyl;

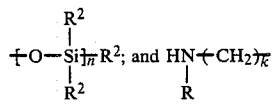

wherein k is an integer from 3 to about 5;
wherein n is a natural number from 1 to about 10,000;
wherein m is a natural number from 1 to about 10,000;
wherein the sum m+n is less than about 10,000; and
wherein at least one of $R^1$ or $R^2$ is

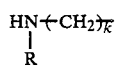

wherein R is selected from the group consisting of substituted and unsubstituted alkyl, cycloalkyl, aryl and aralkyl radicals carrying no primary amino groups; and wherein each $R^2$ is individually selected from the group consisting of alkyl; alkoxy; halogenated alkyl; acetoxy; and substituted and unsubstituted cycloalkyl, aryl, and aralkyl;

(b) a prereact comprising the reaction product of (a) with a resin reactive therewith, said resin selected from the group consisting of epoxy, cyanate, and bismaleimide resins and mixtures thereof; and (c) mixtures of (a) and (b).

2. The process of claim 1 wherein said heat-curable resin system is selected from the group consisting of:
(a) epoxy resin systems,
(b) cyanate resin systems,
(c) bismaleimide resin systems, and
(d) mixtures thereof.

3. The process of claim 2 wherein each $R^1$ is individually selected from the group consisting of methyl radicals, phenyl radicals, and

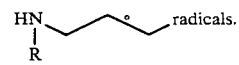

4. The process of claim 2 wherein said heat-curable resin system is an adhesive.

5. A heat-curable resin composition, comprising
(a) a heat-curable resin system, and
(b) a silicone modifier selected from the group consisting of
(i) secondary amine-functionalized organosilicones having the formula

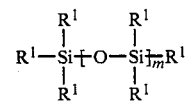

wherein each $R^1$ is individually selected from the group consisting of alkyl; alkoxy; halogenated alkyl; acetoxy; and substituted and unsubstituted cycloalkyl, aryl, and aralkyl;

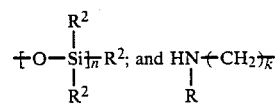

wherein k is an integer from 3 to about 5;
wherein n is a natural number from 1 to about 10,000;
wherein m is a natural number from 1 to about 10,000;
wherein the sum m+n is less than about 10,000;
wherein at least one of $R^1$ or $R^2$ is

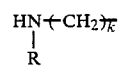

wherein R is selected from the group consisting of substituted and unsubstituted alkyl, cycloalkyl, aryl and aralkyl radicals carrying no primary amino groups; and wherein each $R^2$ is individually selected from the group consisting of alkyl; alkoxy; halogenated alkyl; acetoxy; and substituted and unsubstituted cycloalkyl, aryl, and aralkyl;

(ii) a prereact prepared by reacting the secondary amine-functionalized organo-silicone of (b)(i) with a resin reactive therewith, said resin selected from the group consisting of epoxy resins, cyanate resins, bismaleimide resins, and (iii) mixtures thereof.

6. The composition of claim 5 wherein said heat-curable resin system is selected from the group consisting of
(a) epoxy resin systems,
(b) cyanate resin systems,
(c) maleimide-group-containing resin systems, and
(d) mixtures thereof.

7. The composition of claim 6 wherein each $R^1$ is individually selected from the group consisting of methyl radicals, phenyl radicals, and

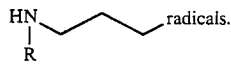 radicals.

8. The heat-curable resin composition of claim 6 wherein said composition is an adhesive.

9. The heat-curable resin composition of claim 5, further comprising from 40 to about 90 percent by weight, relative to the weight of the total composition, or reinforcement seclected from the group consisting of woven and nonwoven yarn, tape, and cloth comprising fiberglass, carbon/graphite, boron, or thermoplastic fiber wherein said reinforcement contributes substantially to the strength of the cured composition.

10. The composition of claim 9 wherein said thermoplastic reinforcement is selected from the group consisting of high modulus polyolefin, aramid, polyetherketone, polyetheretherketone, polyetherketoneketone, polyethersulfone, polyphenylenesulfide, polyketonesulfone, and polyetherketonesulfone.

11. The composition of claim 9 wherein said thermoplastic fiber has a glass transition temperature Tg above 150° C.

12. The heat-curable resin composition of claim 5, further comprising from 1 to about 25 percent by weight, relative to the weight of the total composition, of support selected from the group consisting of woven and nonwoven yarn, tape, and cloth comprising fiberglass, carbon/graphite, boron, or thermoplastic fiber wherein said support does not contribute substantially to the strength of the cured composition.

* * * * *